United States Patent
Lee et al.

(10) Patent No.: US 7,251,276 B2
(45) Date of Patent: *Jul. 31, 2007

(54) LOOP-FILTERING METHOD FOR IMAGE DATA AND APPARATUS THEREFOR

(75) Inventors: Yung-lyul Lee, Seoul (KR); Hyun-wook Park, Seoul (KR)

(73) Assignees: Samsung Electronics Co., Ltd, Kyungki-Do (KR); Korean Advanced Institution of Science & Technology, Daejun (KR)

( * ) Notice: Subject to any disclaimer, the term of this patent is extended or adjusted under 35 U.S.C. 154(b) by 112 days.

This patent is subject to a terminal disclaimer.

(21) Appl. No.: 10/405,642

(22) Filed: Apr. 3, 2003

(65) Prior Publication Data

US 2003/0219073 A1 Nov. 27, 2003

Related U.S. Application Data

(63) Continuation of application No. 09/302,989, filed on Apr. 30, 1999, now Pat. No. 6,665,346.

(30) Foreign Application Priority Data

Aug. 1, 1998 (KR) ................... 98-31431
Nov. 2, 1998 (KR) ................... 98-46822

(51) Int. Cl.
*H04N 7/12* (2006.01)
*H04B 1/66* (2006.01)

(52) U.S. Cl. ............................... 375/240.03

(58) Field of Classification Search .......... 375/240.29, 375/240.24, 240.22; 348/420.1, 699, 700, 348/606, 625, 607; 382/232, 234, 238; *H04N 7/12*
See application file for complete search history.

(56) References Cited

U.S. PATENT DOCUMENTS

| | | | | |
|---|---|---|---|---|
| 5,311,310 A | * | 5/1994 | Jozawa et al. | ......... 375/240.13 |
| 5,365,271 A | * | 11/1994 | Asano | ................. 348/402.1 |
| 5,432,870 A | | 7/1995 | Schwartz | |
| 5,475,434 A | * | 12/1995 | Kim | ................. 375/240.24 |
| 5,682,205 A | * | 10/1997 | Sezan et al. | ................ 348/452 |

(Continued)

FOREIGN PATENT DOCUMENTS

JP      2-137489      5/1990

(Continued)

*Primary Examiner*—Nhon Diep
(74) *Attorney, Agent, or Firm*—Sughrue Mion, PLLC

(57) ABSTRACT

A loop-filtering method for reducing quantization effect generated when an image data is encoded and decoded, and an apparatus therefor. The loop-filtering method includes the steps of extracting a flag indicating whether the image data requires loop-filtering using the distribution of inverse quantized coefficients (IQCs) of an inverse quantized image data and a motion vector indicating the difference between the previous frame and the current frame. The image data corresponding to the flag is then filtered by a predetermined method if the extracted flag indicates a need for the loop-filtering. Using the flags and an adaptive filter reduces the quantization effect and is useful to reduce the amount of computation required for the filtering. Also, the filtering can be performed through parallel processing without multiplication and division, so that the complexity of hardware can be reduced.

6 Claims, 6 Drawing Sheets

U.S. PATENT DOCUMENTS

| | | | |
|---|---|---|---|
| 5,715,008 A * | 2/1998 | Sekiguchi et al. | 375/240.15 |
| 5,768,433 A * | 6/1998 | Bolton | 382/238 |
| 5,825,475 A | 10/1998 | Formosa | |
| 5,844,614 A | 12/1998 | Chong et al. | |
| 5,920,356 A | 7/1999 | Gupta et al. | |
| 6,125,398 A * | 9/2000 | Mirashrafi et al. | 709/236 |
| 6,381,276 B1 * | 4/2002 | Pesquet-Popescu | 375/240.11 |
| 6,683,988 B1 * | 1/2004 | Fukunaga et al. | 382/236 |
| 6,708,231 B1 * | 3/2004 | Kitagawa | 710/10 |
| 6,825,886 B2 * | 11/2004 | Kobayashi et al. | 348/405.1 |
| 2003/0202605 A1 * | 10/2003 | Hazra et al. | 375/240.26 |

FOREIGN PATENT DOCUMENTS

| | | |
|---|---|---|
| JP | 2-235491 | 9/1990 |
| JP | 5-56416 | 3/1993 |
| JP | 5-130592 | 5/1993 |
| JP | 5-219498 | 8/1993 |
| KP | 1998-703741 | 12/1998 |
| WO | WO 97/29586 | 8/1997 |

* cited by examiner

FIG. 6A
FIG. 6B
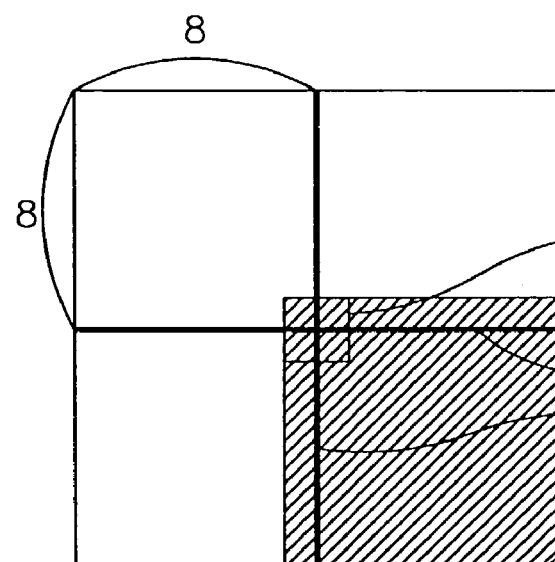
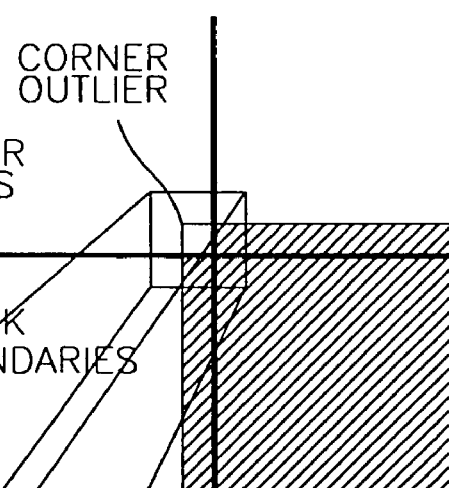
(a)
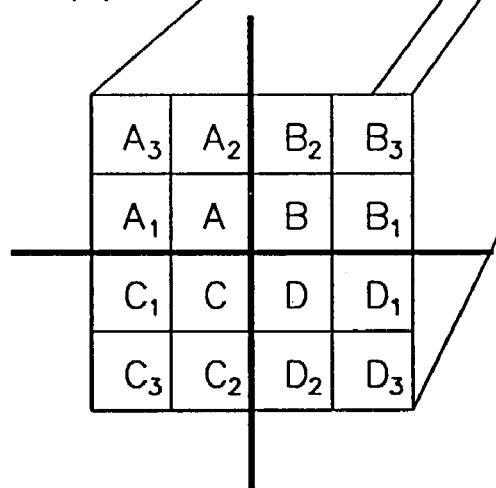
FIG. 6C

LOOP-FILTERING METHOD FOR IMAGE DATA AND APPARATUS THEREFOR

This is a continuation of application Ser. No. 09/302,989 filed Apr. 30, 1999 now U.S. Pat. No. 6,665,346 the disclosure of which is incorporated herein by reference.

BACKGROUND OF THE INVENTION

1. Field of the Invention

The present invention relates to image data processing, and more particularly, to a method for loop-filtering image data to reduce a quantization effect and an apparatus therefor.

2. Description of the Related Art

Generally, picture encoding standards such as MPEG of the International Standardization Organization (ISO) and H.263 recommended by the International Telecommunication Union (ITU) adopt block-based motion estimation and discrete cosine transform (DCT) blocks. Most picture encoding standards utilize the DCT in 8×8 pixel block units in order to pack information with a small number of transform coefficients. This block-based DCT scheme is based on the local spatial correlation properties of an image.

However, when the block-based image data is restored, considerable image deterioration, for example, blocking artifacts near the block boundary, corner outliers at the cross points of blocks, and ringing noise near the image edges, occurs. This is because the image data go through the DCT in 8×8 pixel block units prior to quantization. Such deterioration is serious when the image is highly compressed.

Blocking artifacts are caused by grid noise generated along the block boundary in a relatively homogeneous area. The grid noise shows traces of the block-based process at the edges between blocks when the compressed data is displayed on a screen after being restored. Thus, the edges between blocks are noticeable. The corner outlier is generated where the corners of the 8×8 blocks meet. Also, the ringing noise is a typical Gibb's phenomenon occurring by truncation when the coefficients of high-frequency components of the DCT are quantized so as to highly compress the image. Due to the ringing noise, one can notice overlapping of images with a predetermined interval.

In order to reduce the blocking artifacts, the corner outliers and the ringing noise occurring when block-based coding is performed, several methods have been suggested. A single-adaptive filtering (SAF) method has been introduced in order to reduce the quantization effect of JPEG-decompressed images by Y. L. Lee, H. C. Kim, and H. W. Park (*"Blocking Effect Reduction of JPEG images by Signal Adaptive Filtering"* in Press IEEE Trans. On Image Processing, 1997]. B. Ramanurthi and A. Gersho have suggested a method in which a two-dimensional (2-D) filter is used to reduce the blocking artifact while a one-dimensional (1-D) filter is used to reduce staircase noise [*"Nonlinear Space Variant Postprocessing of Block Coded Images"*, IEEE Trans. on ASSP, Vol. 34, No. 5, pp 1258-1267, 1986]. Also, an iterative image-recovery algorithm using the theory of projections onto convex sets (POCS) has been proposed by Y. Ynag, N. Galatsanos and A. Katsaggelos [*"Projection-Based Spatially Adaptive Reconstruction of Block-Transform Compressed Images,"* IEEE Trans. on Image Processing, Vol. 4., No. 7, pp 896-908, July 1995]. Also, an article entitled *"A Deblocking Algorithm for JPEG compressed Images Using Overcomplete Wavelet Representations"* has been disclosed by Z. Xiong, M. T. Orchard and Y. Q. Zhang [IEEE Trans. Circuits System Video Technology, Vol. 7, No. 2, pp 433-437, 1997].

However, the above methods require complicated computations.

SUMMARY OF THE INVENTION

To solve the above problems, it is an object of the present invention is to provide a method for loop-filtering image data and an apparatus therefor, capable of encoding at a low bit rate without need for complicated computations, by which quantization effects such as blocking artifacts, corner outliers and ringing noise caused by block-based decoding can be reduced.

According to one aspect of the object, there is provided a loop-filtering method for reducing quantization effect generated when an image data is encoded and decoded, the method comprising the steps of: extracting a flag indicating whether the image data requires loop-filtering using the distribution of inverse quantized coefficients (IQCs) of an inverse quantized image data and a motion vector indicating the difference between the previous frame and the current frame; and filtering the image data corresponding to the flag by a predetermined method if the extracted flag indicates a need for the loop-filtering.

Preferably, in the extracting step, the flag is extracted from a discrete cosine transform (DCT) domain of each block if an image frame to be loop-filtered is an intra frame, and from a residual signal and a reference frame if the image frame to be loop-filtered is an inter frame.

Preferably, the flag comprises a blocking flag indicating whether reduction of blocking artifacts near block boundaries is required, and a ringing flag indicating whether reduction of ringing noise near image edges is required.

Preferably, in the case where the image data is an intra frame, the blocking flag of the intra frame comprises a horizontal blocking flag (HBF) and a vertical blocking flag (VBF), wherein the horizontal and vertical blocking flag extraction of the intra frame comprises the steps of: calculating DCT coefficients of the inverse quantized 8×8 block after the compressed image data is inverse quantized; assuming that a pixel A (DC coefficient) is located at the top, far left corner of an 8×8 block consisting of 64 pixels, a pixel B is located to the right of the pixel A, and a pixel C is located below the pixel A, setting the HBF and the VBF to "1" indicating a need for the loop-filtering if only the coefficients in pixels A are non-zero; setting the VBF to "1" indicating a need for the loop-filtering if only the top row of the inverse quantized 8×8 block is non-zero; and setting the HBF to "1" indicating a need for the loop-filtering if only the far left column of the inverse quantized 8×8 block is non-zero.

Preferably, in the extraction of the ringing flag from the intra frame, assuming that a pixel A (DC coefficient) is located at the top, far left corner of the 8×8 block consisting of 64 pixels, a pixel B is located to the right of the pixel A, and a pixel C is located below the pixel A, ringing flag RF is set to "1" indicating a need for loop-filtering when any pixel other than the pixels A, B and C of the inverse quantized 8×8 block has a non-zero coefficient.

Preferably, the blocking flag of the current inter frame comprises a horizontal blocking flag and a vertical blocking flag, wherein assuming that a reference frame comprises a predetermined number of reference blocks, a block of the reference frame predicted by a motion vector ($MV_x0$, $MV_y0$) of the block $A_c0$ of the current inter frame is a motion block X0, the horizontal and vertical blocking flag extraction on a block $A_c0$ of the current inter frame comprises the steps of: investigating the degree of overlapping between the motion block X0 and the reference blocks; bit-wise AND-operating the HBF and the VBF of the reference blocks having a predetermined number of overlapped pixels; and setting the result of the bit-wise AND operation as horizontal and vertical blocking flags of the block $A_c0$ of the current video object plane (VOP).

Preferably, the horizontal and vertical blocking flag extraction on the block $A_c0$ of the current inter frame further comprises the step of setting the blocking flag of the reference macro block as the blocking flag of the current macroblock if a motion vector of the current macro block is a skipped macro block having zero motion vector.

Preferably, the horizontal and vertical blocking flag extraction on the block $A_c0$ of the current inter frame further comprises the step of padding the blocking flag of the reference block after replicating the blocking flag.

Preferably, the ringing flag extraction on a block $A_c0$ of the current inter frame in the case where the image frame is an inter frame, comprises the steps of: setting a ringing flag RF of the current block $A_c0$ to '1' if any AC component of inverse quantized coefficients (IQCs) of a residual signal of the 8×8 inter blocks is non-zero, and to '0' if all AC components of the IQCs are zero; and setting the RF to '1' when the current block is in an 8×8 prediction mode for transferring a motion vector on the macro block.

Preferably, in the case where the image data is an inter frame, the ringing flag of the inter frame comprises a first ringing flag (RF0) and a second ringing flag (RF1), wherein extraction of the first and second ringing flags RF0 and RF1 on a block $A_c0$ of the current inter frame comprise the steps of: setting the first ringing flag RF0 of the current block $A_c0$ to '1' if only the DC components of inverse quantized coefficients (IQCs) of a residual signal of the 8×8 inter macro blocks are non-zero, and otherwise, setting the RF0 of the current block $A_c0$ to '0'; and setting the second ringing flag RF1 of the current block $A_c0$ to '1' if any AC component of the IQCs of the residual signal of the 8×8 inter frames is non-zero, and otherwise, setting the RF1 of the current block $A_c0$ to '0'.

Preferably, assuming that a predetermined block constituting a frame to be loop-filtered is a block I and a block adjacent to the block I is a block J, the difference between the current block I and the quantized previous block I is not greater than a predetermined value, and the difference between the current block J and the quantized previous block J is not greater than a predetermined value, deblocking filtering is not performed in the filtering step.

Preferably, the deblocking filtering for reducing blocking artifacts comprises the steps of: performing a first filtering for changing a predetermined number of pixel values near a horizontal block boundary between the blocks I and J if the RFs of the blocks I and J indicate no need for reducing the ringing noise, and both HBFs of the blocks I and J indicate a need for reducing the blocking artifacts; and comparing the difference between two adjacent pixels around the block boundary with the H.263 quantization factor QP if both RFs of the blocks I and J indicate no need for reducing the ringing noise and at least one of the HBFs of the blocks I and J indicates no need for reducing the blocking artifacts, or if at least one of RFs of the blocks I and J indicate a need for reducing the ringing noise, and changing a predetermined number of pixel values, which is less than that for the first filtering, if the difference between two pixels is less than the QP.

Preferably, the deblocking filtering for reducing blocking artifacts comprises the steps of: performing a first filtering for changing a predetermined number of pixel values near a block boundary between the blocks I and J if the RF of the block I indicates no need for reducing the ringing noise, and both blocks I and J are intra-blocks; and comparing the difference between two adjacent pixels around the block boundary with the H.263 quantization factor QP if the RF of the block I indicates no need for reducing the ringing noise and at least one of the HBFs of the blocks I and J indicates no need for reducing the blocking artifacts, and performing a second filtering for changing a predetermined number of pixel values, which is less than that for the first filtering, if the difference between two pixels is less than the QP; performing the first filtering if the RF of the block I indicates no need for reducing the ringing noise, neither the block I nor the block J are intra-blocks, a DC component of inverse quantized coefficient (IQCs) of a residual signal of the block I or J exists, and both HBFs of the blocks I and J are '1'; performing the second filtering if the RF of the block I indicates no need for reducing the ringing noise, neither the block I nor the block J are intra-blocks, a DC component of inverse quantized coefficient (IQCs) of a residual signal of the block I or J exists, and at least one HBF of the blocks I and J is zero; and performing the second filtering if the RF of the block I indicates a need for reducing the ringing noise.

Preferably, the deblocking filtering for reducing blocking artifacts comprises the steps of: performing a first filtering for changing a predetermined number of pixel values near a block boundary between the blocks I and J if the second ringing flag RF1 of the block I indicates no need for reducing the ringing noise, either the block I or the block J is an intra-block and both HBFs of the blocks I and J indicate a need for reducing the blocking artifacts; comparing the difference between two adjacent pixels around the block boundary with the H.263 quantization factor QP if the RF1 of the block I indicates no need for reducing the ringing noise, either the block I or the block J is an intra-block, and at least one of the HBFs of the blocks I and J indicates no need for reducing the blocking artifacts, and performing a second filtering for changing a predetermined number of pixel values, which is less than that for the first filtering, if the difference between two pixels is less than the QP; performing the first filtering if the RF1 of the block I indicates no need for reducing the ringing noise, neither the block I nor the block J are intra-blocks, at least one of RF0s of the blocks I and J is '1' and both HBFs of the blocks I and J are '1'; performing the second filtering if the RF1 of the block I indicates no need for reducing the ringing noise, neither the block I nor the block J are intra-blocks, at least one of RF0s of the blocks I and J is '1', and at least one of the HBFs of the blocks I and J is not 1; and performing the second filtering if the RF1 of the block I is non-zero.

Preferably, assuming that six pixels on the horizontal block boundary between the blocks I and J are A, B, C, D, E and F, wherein the pixels C and D are the nearest pixels on the horizontal block boundary, the pixels A and F are the farthest pixels thereon, and pixels B and D are middle pixels, 7-tab low pass filtering with coefficients (1,1,1,2,1,1,1) is performed for the six pixels during the first filtering, and the second filtering is performed on the pixels C and D, wherein two pixels C and D are replaced as C=C+(D−C)/4 and D=D+(D−C)/4 if the absolute value of the difference between the pixels C and D is smaller than the QP of the H.263.

Preferably, the deringing filtering for reducing the ringing noise in the filtering step is performed if the ringing flag indicates a need for the deringing filtering, and is not performed if the ringing flag indicates no need for the deringing filtering, and the deringing filtering comprises the steps of: (a) detecting horizontal and vertical edges of the image data; and (b) performing a two-dimensional (2-D) signal adaptive filtering on an 8×8 block from which the ringing noise is to be reduced. In the step (a) for the horizontal edge detection, assuming that a pixel[m,n] is the current pixel, a pixel[m][n+1] is located to the right of the pixel[m,n], a pixel[m][n−1] is located to the left of the pixel[m,n], the difference between the pixel[m][n] and the pixel[m][n+1] is A1, the difference between the pixel[m][n] and the pixel[m][n−1] is A2, and QP is the H.263 quantization factor, when the conditional expression ((A1>QP) and (A2>QP)) or (A1>2QP) or (A2>2QP) is satisfied, the current pixel is detected as an edge pixel, and the edge map, Edge[m][n], becomes 1. Also, in the step (a) for the vertical edge detection, assuming that the current pixel is pixel[m][n], a pixel[m+1][n] is located above the pixel[m][n], the lower pixel is pixel[m−1][n], the difference between the pixel[m][n] and the pixel[m+1][n] is A'1, the difference between the pixel[m][n] and the pixel[m−1][n] is A'2, and QP is the H.263 quantization factor, when the conditional expression ((A'1>QP) and (A'2>QP)) or (A'1>2QP) or (A'2>2QP) is satisfied, the current pixel is detected as an edge pixel, and the edge map, Edge[m][n], becomes 1. In the step (b) for the signal adaptive filtering, a 4-connected filter window is applied to the 8×8 block to determine whether the center pixel of the filter window is an edge pixel, and the filtering is performed if the central pixel is an edge pixel, and otherwise, a weighted filtering is performed.

Preferably, the deringing filtering for reducing the ringing noise in the filtering step is not performed if the difference between the current block I and the quantized previous block I is not greater than a predetermined value, and the difference between the current block J and the quantized previous block J is not greater than a predetermined value.

Preferably, the deringing filtering for reducing the ringing noise in the filtering step is performed if the ringing flag of the block I indicates a need for deringing filtering, and otherwise, the deringing filtering is not performed.

Preferably, the deringing filtering for reducing the ringing noise is performed when the block I is an intra block, when the block I is not an intra block and has an 8×8 prediction mode, and when the block I is not an intra block and has no 8×8 prediction mode and the RF1 of the block 1 indicates no need for the deringing filtering, and the deringing filtering is not performed when the RF1 of the block I indicates no need for the deringing filtering.

Preferably, the deringing filtering comprises the steps of: (a) detecting horizontal and vertical edges of the image data; and (b) performing a two-dimensional (2-D) signal adaptive filtering on the 8×8 block from which the ringing noise is to be removed. In the step (a) for the horizontal edge detection, assuming that a pixel[m][n] is the current pixel, a pixel[m][n+1] is located to the right of the pixel[m][n], a pixel[m][n−1] is located to the left of the pixel[m][n], the difference between the pixel[m][n] and the pixel[m][n+1] is A1, the difference between the pixel[m][n] and the pixel[m][n−1] is A2, and QP is the H.263 quantization factor, when the conditional expression ((A1>QP) and (A2>QP)) or (A1>2QP) or (A2>2QP) is satisfied, the current pixel is detected as an edge pixel, and the edge map, Edge[m][n], becomes 1. Also, in the step (a) for the vertical edge detection, assuming that the current pixel is pixel[m][n], a pixel[m+1][n] is located above the pixel[m][n], a pixel[m−1][n] is located below the pixel[m][n], the difference between the pixel[m][n] and the pixel[m+1][n] is A'1, the difference between the pixel [m][n] and the pixel[m−1][n] is A'2, and QP is the H.263 quantization factor, when the conditional expression ((A'1>QP) and (A'2>QP)) or (A'1>2QP) or (A'2>2QP) is satisfied, the current pixel is detected as an edge pixel, and the edge map, Edge[m][n], becomes 1. In addition, in the step (b) for the signal adaptive filtering a 4-connected filter window is applied to the 8×8 block to determine whether the center pixel of the filter window is an edge pixel, and the filtering is performed if the central pixel is an edge pixel, and otherwise, a weighted filtering is performed.

Preferably, for reducing corner outlier generated at the point where the corners of four blocks meet when the image data is block-based coded and decoded, the loop-filtering method further comprises the steps of: (a) detecting a corner outlier of an 8×8 block of the inverse quantized image data; and (b) compensating for the detected corner outlier. In the step (a) for the detection, assuming that A0, B0, C0 and D0 are four pixels around the point where the four corners meet, and value[0], value[1], value[2] and value[3] are pixel values of the pixels A0, B0, C0 and D0 respectively, the average of the pixels values is set to (A+B+C+D+2)/4 0, the difference between each pixel value of the average is compared to the H.263 quantization factor QP, and the number of corner outlier candidate pixels is accumulated to detect the corner outlier if the difference is greater than QP. Also, in the step (b) for the compensation, assuming that $A_1 0$ and $A_2 0$ are pixels adjacent to the pixel A0 and $A_3 0$ is a pixel diagonal to the pixel A0 in the same block of the pixel A0, and A'0, $A_1$'0 and $A_2$'0 are the compensated values of the pixels A'0, $A_1$'0 and $A_2$'0, respectively, when only one corner outlier candidate is detected and the detected candidate is the pixel A0 and the difference between the pixels A0 and $A_3 0$ is less than 3QP/2, the corner outlier compensation is performed using the following equation:

$$A' = (4A + B + C + 2D + 4)/8$$
$$A'_1 = (A' + 3A_1 + 2)/4$$
$$A'_2 = (A' + 3A_2 + 2)/4,$$

and when the number of candidates is more than two, the candidate which has the largest difference from $(A_3+B_3+C_3+D_3+2)/4$ 0 is selected, and corner outlier compensation is performed on that point in the same manner as in the case of only one candidate.

According to another aspect of the object, there is provided an apparatus for loop-filtering image data, capable of reducing quantization effect generated when an image data is encoded and decoded, the apparatus comprising: a flag extractor for extracting a flag indicating whether the image data requires loop-filtering, using distribution of inverse quantized coefficients (IQCs) of the image data, and a motion vector indicating the difference between the previous frame and the current frame; a deblocking filter for deblocking filtering the image data by investigating the blocking flag extracted by the flag extractor; a corner outlier compensator for detecting the corner outlier of the deblocking-filtered data and compensating for the detected corner outlier; and a deringing filter for deringing-filtering the corner outlier compensated data by investigating the ringing flag extracted by the flag extractor, and wherein the flags comprise a blocking flag indicating whether a need for reducing blocking artifacts near block boundaries exists, and a ringing flag indicating whether there is a need for reducing ringing noise near image edges.

The invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium.

According to still another aspect of the present invention, there is provided a computer readable medium having embodied thereon a computer program for loop-filtering image data, capable of reducing quantization effect generated when the image data is block-based encoded and decoded, wherein the loop-filtering comprises the steps of: (a) extracting a flag indicating whether the image data requires loop-filtering using the distribution of inverse quantized coefficients (IQCs) of an inverse quantized image data and a motion vector indicating the difference between the previous frame and the current frame; and (b) filtering the image data corresponding to the flag by a predetermined method if the extracted flag indicates a need for the loop-filtering, wherein in the step (a) the flag is extracted from a discrete cosine transform (DCT) domain of each block if an image frame to be loop-filtered is an intra frame, and from a residual signal and a reference frame if the image frame to be loop-filtered is an inter frame.

BRIEF DESCRIPTION OF THE DRAWINGS

The above object and advantages of the present invention will become more apparent by describing in detail preferred embodiments thereof with reference to the attached drawings in which:

FIG. 6A shows an example of the edges of image generating corner outliers due to quantization, FIG. 6B shows the corner outlier generated by the quantization, and FIG. 6C shows coordinates of corner points for compensating for the corner outlier;

DESCRIPTION OF THE PREFERRED EMBODIMENTS

Figure 1:
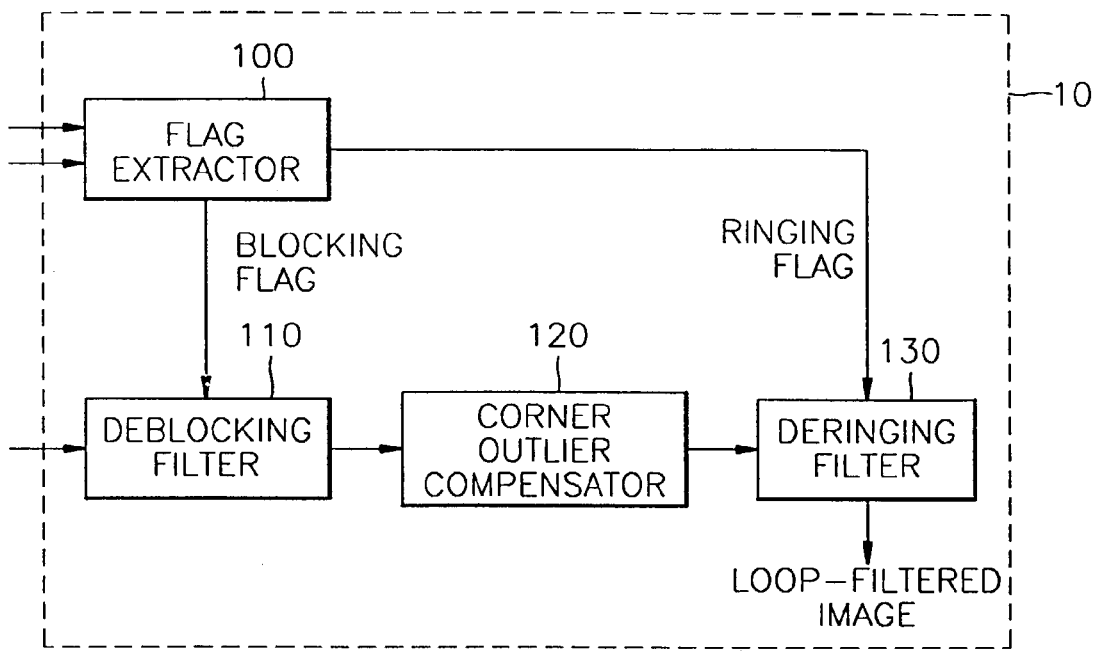
FIG. 1 is a block diagram of an apparatus for loop-filtering image data, capable of reducing quantization effect of the block-based image data.

In FIG. 1, an apparatus 10 for loop-filtering image data for reducing quantization effect occurring when the image data is block-base coded and decoded, which is used in connection with a general encoder and decoder, comprises a flag extractor 100, a deblocking filter 110, a corner outlier compensator 120 and a deringing filter 130.

The flag extractor 100 extracts a flag using the distribution of inverse quantized coefficients (IQCs) of an inverse quantized image data, and a motion vector indicating the difference between the previous frame and the current frame. The flag is the information indicating whether the decoded image requires the loop-filtering, and is made up of a blocking flag and a ringing flag. The blocking flag indicates whether the blocking artifacts near the block boundary must be reduced, and the ringing flag indicates whether the ringing noise near the image edges must be reduced. Also, the blocking flag consists of a horizontal blocking flag (HBF) indicating whether the loop-filtering is performed on the pixels of adjacent blocks around a horizontal block boundary, and a vertical blocking flag (VBF) indicating whether the loop-filtering is performed on the pixels of adjacent blocks around a vertical blocking boundary.

Also, the flag extraction is performed on intra frames and inter frames. The present invention contemplates that each inter frame is composed of a P frame and a PB frame. The distribution of IQCs of the inverse quantized image data is utilized for the flag extraction on the intra frames. The flag extraction on the inter frames utilizes the motion vector indicating the difference between the previous frame and the current frame, and a detailed description of this will be provided later.

The deblocking filter 110 checks the blocking flag extracted by the flag extractor 100 using one-dimensional (1-D) horizontal and vertical low pass filters (LPFs), thereby deblocking-filtering the image data.

The outlier compensator 120 detects the corner outlier of the data passed through the deblocking filter 110, and compensates for the detected corner outliers.

The deringing filter 130 checks the ringing flag extracted by the flag extractor 100 using a 2-D signal adaptive filter (SAF), to deringing-filter the corner outlier compensated data.

The basic idea of the loop-filtering method on the image data according to the present invention is to adaptively filter using spatial frequency and temporal information to reduce the quantization effect.

Also, subjective image quality, peak signal-to-noise ratio (PSNR) and complexity of computation are considered. In particular, when the basic idea is realized using software and hardware, the complexity of computation is a very important decisive factor. The distribution of the IQCs is investigated to extract the information of blocking artifacts and ringing noise in every 8×8 block. A 1-D LPF and a 2-D SAF are adaptively applied in every 8×8 block using the blocking and ring flags.

Two embodiments relating to the ringing noise are introduced in the present invention: the ringing flag being set as one ringing flag (RF) in the first embodiment and being set as two, first and second ringing flags RF0 and RF1, in the second embodiment. In the case where there is no mention about the first and second embodiments in explaining the following embodiments, it means that the two embodiments are commonly applied. Also, in the case when either the first or the second embodiment is applied, the corresponding embodiment would be mentioned.

First, the flag extraction of the blocking artifacts and ringing noise in the flag extractor 100 will be described.

1. The Information of Blocking Artifacts and Ringing Noise

In order to reduce the quantization effects in the H.263+, two kinds of flags are defined: the blocking flags and the ringing flags. The blocking and the ringing flags are extracted from the DCT domain of each 8×8 block in the intra-macro block (MB). Also, the flags of the inter-MB are calculated from both a residual signal and flags of a reference video object plane (VOP).

1.1 Flag Information for Intra-Macro Block (Intra MB)

Figure 2:
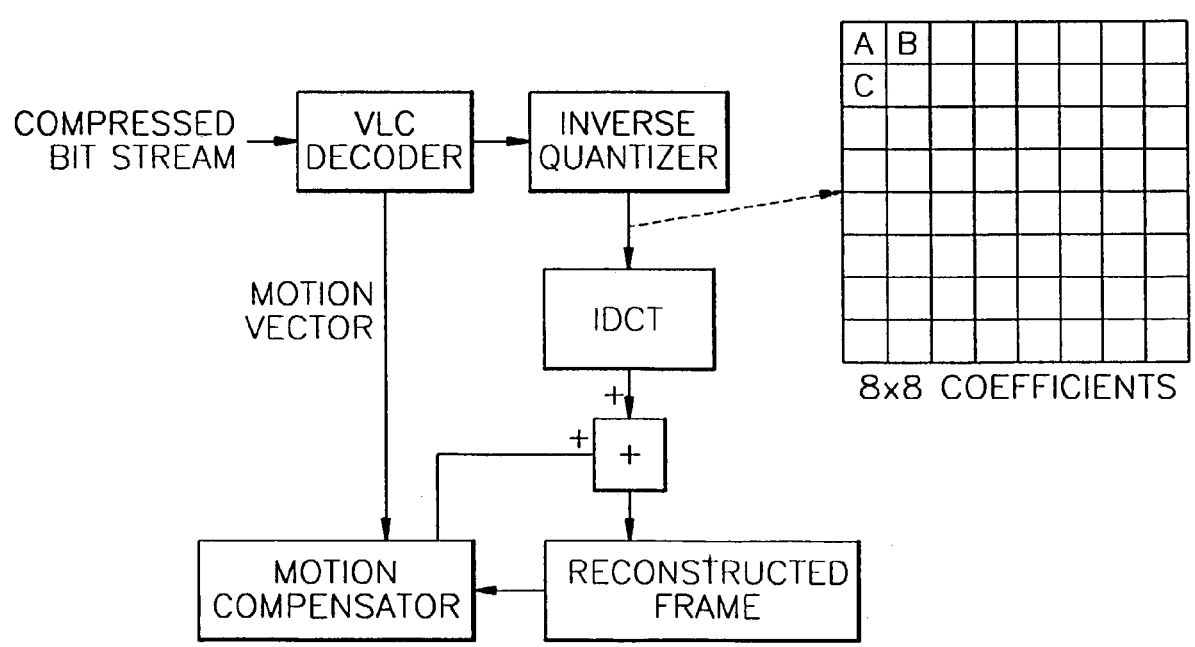
FIG. 2 shows the structure of a decoder according to the H.263+, and 8×8 discrete cosine transform (DCT) coefficient block inverse-quantized by an inverse quantizer of the decoder.

The distribution of IQCs (the DCT coefficients after inverse quantization) is investigated in the decoder and decoder. FIG. 2 shows the block diagram of a H.263+ decoder and the DCT coefficients after inverse quantization. In the 8×8 inverse quantized block of FIG. 2, the coefficients of A, B and C are used for deciding the blocking and the ringing flags.

When only the coefficient in position A (a DC component) among 64 DCT coefficients of the 8×8 block shown in FIG. 2 has a non-zero value, 64 pixels of the coded 8×8 block have the same values in the spatial domain. Thus, a block having only a DC component can induce horizontal and vertical blocking artifacts. In this case, both the HBF and the VBF of the block are set to 1.

When only the coefficients in the top row of the 8×8 inverse quantized block have non-zero values, the eight pixels in each column have the same value in the spatial domain. This block may induce vertical blocking artifacts, so the VBF is set to 1.

When only the coefficients in the far left column have non-zero values, the eight pixels in each row have the same value in the spatial domain. This block may induce horizontal blocking artifacts, so the HBF is set to 1.

In the first embodiment, the ringing flag RF is set to 1 if a non-zero coefficients exists in positions other than A, B and C in FIG. 2. In the second embodiment, the first ringing flag RF0 is set to 1 if a non-zero coefficients exists in positions other than A, B and C in FIG. 2.

These high-frequency coefficients mean that the block includes image edges. Therefore, the block produces ringing noise around the image edges due to the truncation of the high-frequency coefficients. In the second embodiment, the second ringing flag RF1 is not used in Intra MB.

1.2 Propagation of Flag Information for Inter-Macroblock (Inter MB)

As for the first embodiment, the blocking flags in the reference frames are propagated to the next Inter MB by using the motion vectors. Also, the residual signal of the inter block is used to decide the flag of the inter-block. The propagation of the blocking flag from the reference frame to the inter frame is as follows.

Figures 3, 4:
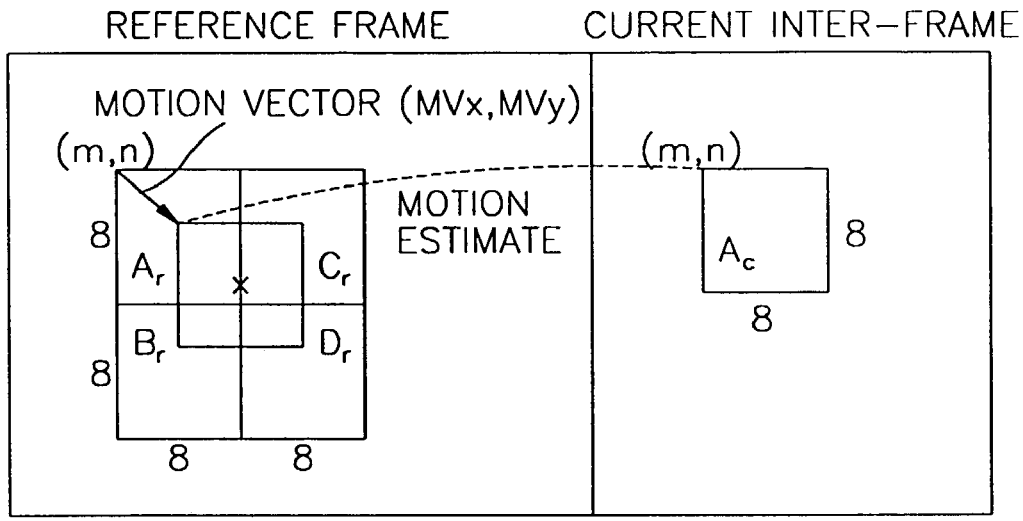
FIG. 3 shows the relationships between an 8×8 block ($A_c0$) in an inter-frame and adjacent blocks of a (reference frame.
FIG. 4 shows an example illustrating extraction of horizontal blocking flag (HBF), vertical blocking flag (VBF) and ringing noise (RF) of the inter video object plane (VOP)

FIG. 3 shows the relationship between the 8×8 block ($A_c0$) in the inter-frame and the adjacent blocks of the reference frame. The propagation of the blocking flag is described by the motion vectors $MV_x0$ and $MV_yO$ as follows. In FIG. 3, $A_r0, B_r0, C_r0$ and $D_r0$ are the blocks of the reference frame. $A_c0$ is a block in the current inter-frame, and X0 is the motion block of $A_c0$, which is estimated by using the motion vector ($MV_x, MV_y0$). First, the degree of overlapping of the motion vector X0 and the reference block is investigated. When only the blocks in which the overlapped region between the motion block X0 and the reference block is wider than 2×2 pixels are used, the HBF and the VBF of the current block $A_c0$ can be calculated by a bit-wise AND operation on the HBF and the VBF of the reference blocks which are overlapped by the motion-estimated block X0.

For example, when $MV_x0=5$ and $MV_y0=3.5$, the motion-estimated block X0 is overlapped with four reference blocks $A_r0, B_r0, C_r0$ and $D_r0$. Here, the four overlapped regions are all wider than 2×2 pixels. Thus, the HBS and the VBS of the current block $A_c0$ can be calculated from the four reference blocks $A_r0, B_r0, C_r0$ and $D_r0$ as shown in FIG. 4. Here, '&' indicates the bit-wise AND operation.

Next, the ringing flag in the inter-frame will be described. First of all, the RF of the reference block $A_c0$ is set to 1 if the IQC of the residual signals in the 8×8 block of the inter-frame is non-zero. Transferring four motion vectors for one MB is called an 8×8 prediction mode. The 8×8 prediction mode is applied to a busy area, most having a high-frequency component. Thus, it is investigated whether or not the block has the 8×8 prediction mode, and the RF of the block having the 8×8 prediction mode is set to 1.

As for the second embodiment, the blocking flags in the reference frame (I picture or P picture or the P picture part of an improved PB frame) are propagated to the next Inter MB by using the motion vectors. Also, the residual signal of the inter block is used to decide the flag of the inter-block. If the current MB is the skipped MB (COD-1), the blocking flags of six blocks (four for Y, one for $C_b0$ and one for $C_r0$) in the reference MB are duplicated to the corresponding blocks of the current MB.

The propagation of the blocking flag from the reference frame to the inter-frame is similar to the first embodiment. However, the AND operation for calculating the HBS and the VBS of the current block $A_c0$ is applied to the blocks whose overlapped region with the block X0 is wider than 1×1 pixel, unlike the first embodiment in which the AND operation is applied to the blocks whose overlapped region with the block X0 is wider than 2×2 pixels. For example, when $MV_x0=5$ and $MV_y0=3.5$, the motion-estimated block X0 is overlapped with four reference blocks $A_r0, B_r0, C_r0$ and $D_r0$. Here, the four overlapped regions are all wider than 1×1 pixel.

Next, the ringing flag in the inter-frame will be explained. First of all, the IQC of the residual signals in the 8×8 block of the Inter MB is investigated. The RF0 of the block $A_c0$ is set to 1 if only the DC component of the IQC is non-zero and the other components are all zero. Also, the RF1 of the reference block $A_c0$ is set to 1 if any AC components of IQC of the residual signals are non-zero. The 8×8 prediction mode is considered in the ringing filtering.

2. Loop-Filtering Method Using Flag

The deblocking filter 110, the corner outlier compensator 120 and the deringing filter 130 will be described in detail.

2.1 Deblocking Filter for Reducing Blocking Artifacts

One-D LPF for reducing the blocking artifacts is performed strongly or weakly, depending on the blocking flags, on the horizontal and vertical block boundaries. According to most deblocking methods for reducing the blocking artifacts, image-edge information is calculated and a LPF is adaptively used based on the image edges. However, the deblocking method according to the present invention uses the blocking flag obtained above, so that image edge detection which requires a large amount of calculation is not necessary.

Figure 5:
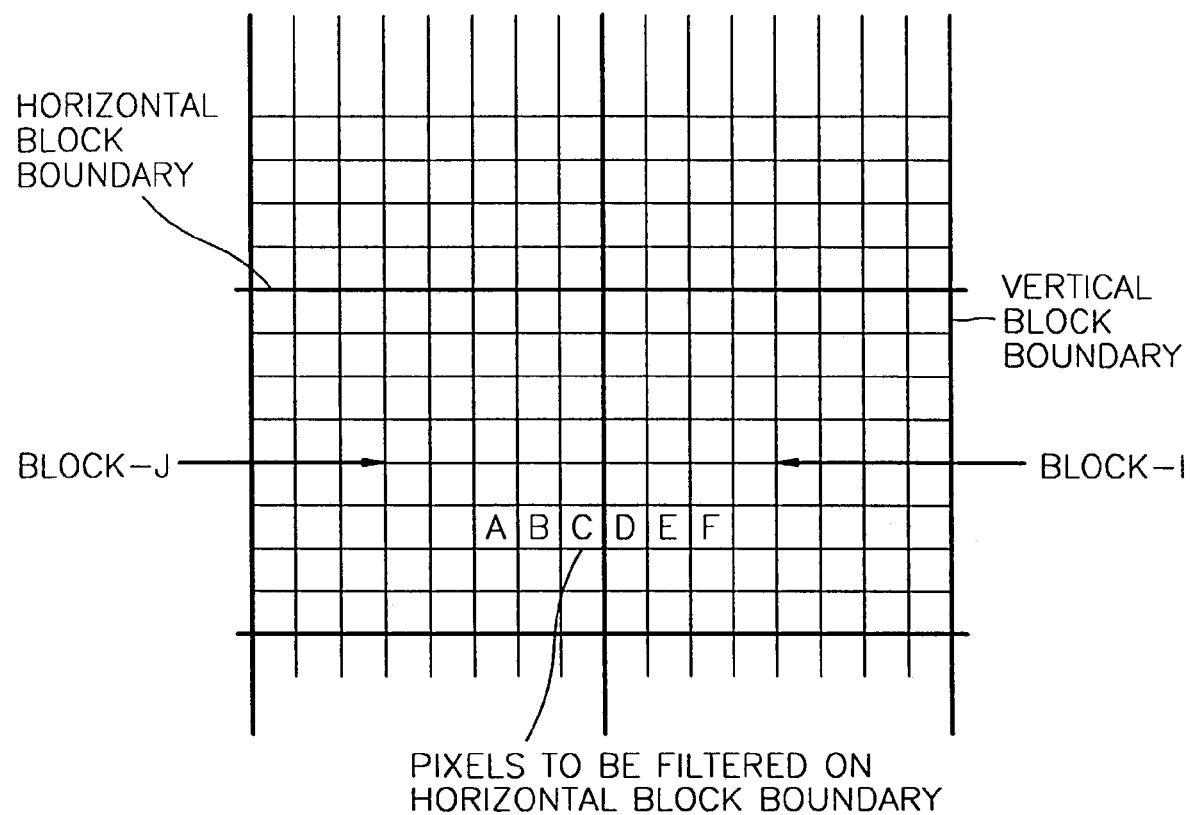
FIG. 5 shows the block boundaries and the location of pixels adjacent to the block boundaries for illustrating the filtering of a deblocking filter for reducing blocking artifacts.

The current 8×8 block to be processed and the adjacent blocks are shown in FIG. 5. If both HBFs of the BLOCK-I and BLOCK-J are set to 1, a 7-tab LPF with coefficients (1,1,1,2,1,1,1) is applied for six pixels (A,B,C,D,E,F) on the horizontal block boundary in FIG. 5.

The algorithm of the horizontal deblocking filtering in the first embodiment is expressed as follows.

---

If (BLOCK_I == NOT coded && BLOCK_J NOT coded) No deblocking filter;
if (INTRA frame) {
    if (RF of BLOCK_I == 0 && RF of BLOCK_J == 0){/*No Ringing Noise*/
        if (HBF of BLOCK_I == 1 && HBF of BLOCK_J == 1)
           strong deblocking filtering;

-continued

```
    else
        weak deblocking filtering;
    }
    else weak deblocking filtering;
}
if (P or PB_frame) {
    if (RF of BLOCK_I == 0){/* No Ringing Noise*/
        if (BLOCK_I == INTRA || BLOCK_J == INTRA){
            If (HBF of BLOCK I ++ I && HBF of BLOCK_J
== 1)
                strong deblocking filtering;
            else
                weak deblocking filtering;
            }
        else {
    if (DC component of residual IQC of BLOCK_I or BLOCK_J
exist){
            If (HBS of BLOCK_I == 1 && HBF of BLOCK_J ==1)
                strong deblocking filtering;
            else
                weak deblocking filtering;
            }
        }
    }
}
else /*Ringing Noise*/
    weak deblocking filtering;
}
```

In explaining the algorithm, assuming that a block constituting a frame to be loop-filtered is BLOCK_I, the block adjacent to the BLOCK_I is BLOCK_J, the difference between the current BLOCK_I and the previous quantized BLOCK_I is not greater than a predetermined value, and the difference between the current BLOCK_J and the previous quantized BLOCK_J is not greater than a predetermined value, the deblocking filtering is not performed.

If the frame to be loop-filtered is an intra-frame, in the deblocking filtering for reducing the blocking artifacts, when both RFs of BLOCK_I and BLOCK_J indicate that reduction of ringing noise is not necessary, and both HBFs of BLOCK_I and BLOCK_J indicate that reduction of blocking artifacts is necessary, a first filtering (strong deblocking filtering) for changing a predetermined number of pixel values near the horizontal block boundary between BLOCK_I and BLOCK_J is performed.

When both RFs of BLOCK_I and BLOCK_J indicate that there is no need for reduction of ringing noise and at least one of the HBFs of BLOCK_I and BLOCK_J indicates that reduction of the blocking artifacts is not necessary, or when at least one of the RFs of BLOCK_I and BLOCK_J indicates that reduction of ringing noise is necessary, and the difference between the adjacent two pixels near the horizontal block boundary is less than the H.263 quantization factor (QP), a second filtering (weak deblocking filtering) for changing pixel values whose number is smaller than in the first filtering is performed.

Also, filtering on the pixels near the vertical block boundary is performed in the same manner as for the pixels near the horizontal block boundary, using the VBF.

Meanwhile, if the frame to be loop-filtered is an inter-frame (P or PB frame), in the deblocking filtering for reducing the blocking artifacts, when the RF of BLOCK_I indicates that there is no need for reduction of ringing noise, one of BLOCK_I and BLOCK_J is an intra-block (INTRA) and both HBFs of BLOCK_I and BLOCK_J indicate that reduction of the blocking artifacts is necessary, the first filtering for changing a predetermined number of pixel values near the horizontal block boundary between BLOCK_I and BLOCK_J is performed.

When the RF of BLOCK_I indicates that there is no need for reduction of ringing noise, one of BLOCK_I and BLOCK_J is INTRA, any one of HBFs of BLOCK_I and BLOCK_J indicates that there is no need for reduction of the blocking artifacts, and the difference between the two adjacent pixels near the horizontal block boundary is less than the H.263 quantization factor (QP), the second filtering for changing pixel values whose number is smaller than in the first filtering is performed.

When the RF of BLOCK_I indicates that there is no need for reduction of ringing noise, neither BLOCK_I nor BLOCK_J are INTRA, and both HBFs of BLOCK_I and BLOCK_J are 1, the first filtering is performed.

When the RF of BLOCK_I indicates that there is no need for reduction of ringing noise, neither BLOCK_I nor BLOCK_J are INTRA, and at least one of the HBFs of BLOCK_I and BLOCK_J is 0, the second filtering is performed.

When the RF of BLOCK_I is non-zero, the second filtering is performed.

Assuming that six pixels on the horizontal block boundary between BLOCK_I and BLOCK_J are A, B, C, D, E and F, wherein the pixels C and D are the nearest pixels on the horizontal block boundary, the pixels A and F are the farthest pixels thereon, and pixels B and b are middle pixels, 7-tab low pass filtering with coefficients (1,1,1,2,1,1,1) is performed for the six pixels during the first filtering.

The second filtering is performed on the pixels C and D. Here, if the absolute value of the difference between the pixels C and D is smaller than the QP of the H.263, two pixels C and D are replaced as C=C+(D−C)/4 and D=D+(D−C)/4.

The algorithm of the horizontal deblocking filtering in the second embodiment is expressed as follows.

```
if (BLOCK_I == NOT coded && BLOCK_J NOT coded) No deblocking
filter;
if (INTRA frame){
    if (RF0 of BLOCK_I == 0 && RF0 of BLOCK_J == 0){/*No
Ringing Noise*/
        if (HBF of BLOCK_I == 1 && HBF of BLOCK_J == 1)
            strong deblocking filtering;
        else
            weak deblocking filtering;
    }
    else weak deblocking filtering;
}
if (P or PB_frame){
    if (RF1 of BLOCK_I == 0){/*No Ringing Noise*/
        if (BLOCK_I == INTRA || BLOCK_J == INTRA) {
            If (HBF of BLOCK I ++ 1 && HBF of BLOCK_J == 1)
                strong deblocking filtering;
            else
                weak deblocking filtering;
        }
        else {
            if (RF0 of BLOCK_I == 1 || RF0 of BLOCK_J == 1){
                if (HBS of BLOCK_I == 1 && HBF of BLOCK_J == 1)
                    strong deblocking filtering;
                else
                    weak deblocking filtering;
            }
        }
}
else /*Ringing Noise*/
    weak deblocking filtering;
}
```

In explaining the algorithm, assuming that a block constituting a frame to be loop-filtered is BLOCK_I, the block adjacent to the BLOCK_I are BLOCK_J, the difference between the current BLOCK_I and the previous quantized BLOCK_I is not greater than a predetermined value and the difference between the current BLOCK_J and the previous quantized BLOCK_J is not greater than a predetermined value, the deblocking filtering is not performed.

If the frame to be filtered is an intra-frame, in the deblocking filtering for reducing the blocking artifacts, when the RF0s of both BLOCK_I and BLOCK_J indicate that reduction of ringing noise is not necessary, and the HBFs of both BLOCK_I and BLOCK_J indicate that reduction of blocking artifacts is necessary, first filtering (strong deblocking filtering) for changing a predetermined number of pixel values near the horizontal block boundary between BLOCK_I and BLOCK_J is performed.

When the RF0s of both BLOCK_I and BLOCK_J indicate that there is no need for reduction of ringing noise and at least one of the HBFs of BLOCK_I and BLOCK_J indicates that reduction of the blocking artifacts is not necessary, or when at least one of the RF0s of BLOCK_I and BLOCK_J indicates that reduction of ringing noise is necessary, and the difference between the adjacent two pixels near the horizontal block boundary is less than the H.263 quantization factor (QP), a second filtering (weak deblocking filtering) for changing pixel values whose number is smaller than in the first filtering is performed.

Also, filtering on the pixels near the vertical block boundary is performed in the same manner as for the pixels near the horizontal block boundary, using the VBF.

Meanwhile, if the frame to be loop-filtered is an inter-frame (P or PB frame), in the deblocking filtering for reducing the blocking artifacts, when the RF1 of BLOCK_I indicates that there is no need for reduction of ringing noise, one of BLOCK_I and BLOCK_J is INTRA and the HBFs of both BLOCK_I and BLOCK_J indicate that reduction of the blocking artifacts is necessary, the first filtering (strong deblocking filtering) for changing a predetermined number of pixel values near the horizontal block boundary between BLOCK_I and BLOCK_J is performed.

When the RF1 of BLOCK_I indicates that there is no need for reduction of ringing noise, one of BLOCK_I and BLOCK_J is INTRA, any one of the HBFs of BLOCK_I and BLOCK_J indicates that there is no need for reduction of the blocking artifacts, and the difference between the adjacent two pixels near the horizontal block boundary is less than the H.263 quantization factor (QP), the second filtering (weak deblocking filtering) for changing pixel values whose number is smaller than in the first filtering is performed.

When the RF1 of BLOCK_I indicates that there is no need for reduction of ringing noise, neither BLOCK_I nor BLOCK_J are INTRA, one of the RF0 of BLOCK_I and BLOCK_J is 1, and the HBFs of both BLOCK_I and BLOCK_J are 1, the first filtering (strong deblocking filtering) is performed.

When the RF1 of BLOCK_I indicates that there is no need for reduction of ringing noise, neither BLOCK_I nor BLOCK_J are INTRA, one of the RF0s of BLOCK_I and BLOCK_J is 1, and at least one of the HBFs of BLOCK_I and BLOCK_J is 0, the second filtering (weak deblocking filtering) is performed.

When RF1 of BLOCK_I is non-zero, the second filtering (weak deblocking filtering) is performed.

Also, filtering on the pixels near the vertical block boundary is performed in the same manner as for the pixels near the horizontal block boundary, using the VBF.

Also, the first and second filterings are performed in the same manner as those of the first embodiment.

2.2 Corner Outlier Compensator

Corner outlier compensation is only performed for INTRA frame. A corner outlier is characterized by a pixel which is either much larger or much smaller than its neighboring pixels at the corner point of an 8×8 block as shown in FIGS. 6A through 6C. In FIG. 6A, when a dark-gray region is distributed over four blocks and one or two pixels of the dark-gray region are located at the corner points of neighboring blocks, the corner points can be distorted by quantization of the DCT coefficients as shown in FIG. 6B. Such distortion of the corner points is called a corner outlier. The corner outlier cannot be removed by deblocking and deringing filters. In order to reduce the corner outlier, the corner outlier must be detected and compensated for. FIG. 6C describes a simple coordination for corner outlier detection, where A0, B0, C0 and D0 are the pixel values of the corner points of the 8×8 pixels.

The algorithm for detecting the corner outlier is expressed as follows:

```
value[0] = A; value[1] = B;
value[2] = C; value[3] = D;
Average = (A + B + C + D + 2)/4
Count = 0;
for (m=0; m<4; m++)
    if(|value[m]–Average| > QP)
        Count ++; /*the number of candidate points*/
``` where QP is the H.263 quantization factor, and 'Count' is the variable for storing the number of candidate corner outlier pixels. It is assumed that $A_1 0$ and $A_2 0$ are pixels adjacent to the pixel A0 and $A_3 0$ is a pixel diagonal to the pixel A0 in the same block of the pixel A0. If Count is zero, there is no corner outliers. If A0 is the only candidate point in FIG. 6C and $|A \cdot A_3 0|$ is less than 3QP/2, corner outlier compensation is performed on A0, $A_1 0$ and $A_2 0$ as follows. Assuming that compensated values for A0, $A_1 0$ and $A_2 0$ are A'0, $A_1$'0 and $A_2$'0, respectively, A'0, $A_1$'0 and $A_2$'0 are determined by Equation (1).

$$A' = (4A + B + C + 2D + 4)/8 \qquad (1)$$

$$A'_1 = (A' + 3A_1 + 2)/4$$

$$A'_2 = (A' + 3A_2 + 2)/4$$

If there are more than two candidates, the candidate which has the largest difference from $(A_3+B_3+C_3+D_3+2)/4$ is selected, and corner outlier compensation is performed on that point in the same way as in the case of only one candidate. Here, $B_3$, $C_3$ and $D_3$ indicate pixels diagonal to the pixels A, B, C, respectively.

2.3 Deringing Filter for Reducing Ringing Noise

Figure 7A:
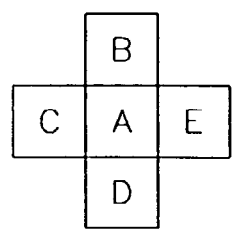
FIG. 7A shows the kernel of a two-dimensional (2-D) signal adaptive filter (SAF)
Figure 7B:
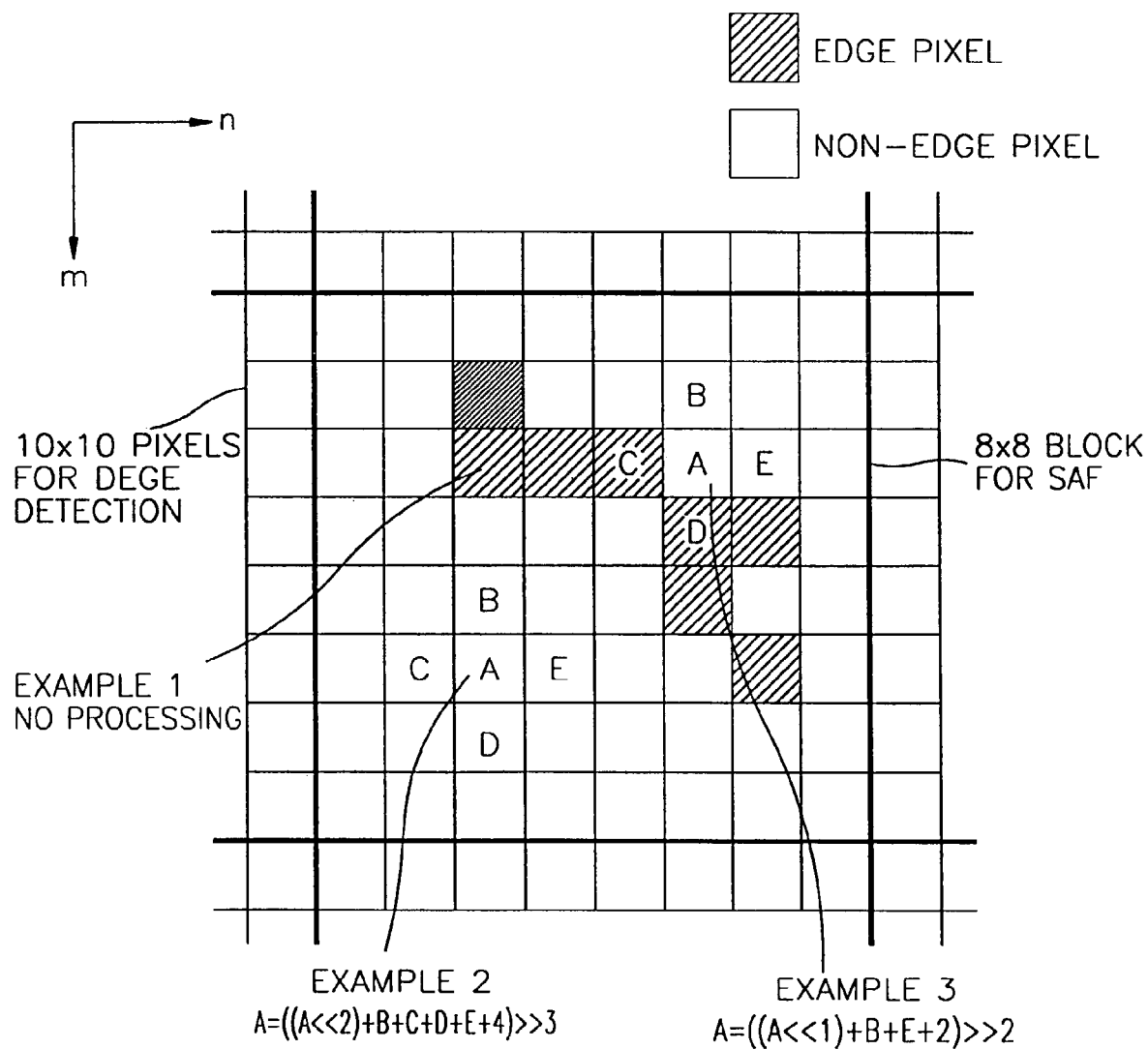
FIG. 7B shows an example of a 10×10 block for edge detection and the SAF.

As a first embodiment, prior to applying the deringing filtering for each block, RF is investigated. If the RF of the current block is 1, deringing filtering is applied to the current block. In order to prevent the image details from being distorted by filtering, simple edge detection is performed before filtering. As shown in FIGS. 7A and 7B, edge detection and 2-D signal adaptive filtering are applied to an 8×8 block having a non-zero ringing flag. This is because the boundary pixels are made smooth by the deblocking filter.

As a second embodiment, prior to applying the deringing filtering for each block, the ringing flags, i.e., RF0 and RF1, are investigated. The algorithm for determining whether to perform deringing filtering for decreasing the ringing noise is expressed as follows.

```
if (BLOCK_I == NOT coded)     No deringing filtering;
if (INTRA frame){
    if (RF0 of BLOCK_I == 1)  deringing filtering;
    else                      No deringing filtering;
}
if (P or PB_frame){
    if (BLOCK_I == INTRA_BLOCK) deringing filtering;
    else{
        if (BLOCK_I == INTER4V_BLOCK)  deringing filtering;
        else{
            If (RF1 of BLOCK_I == 1)    deringing filtering;
            else                        No deringing filtering;
        }
    }
}
```

In explaining the above algorithm, when the difference between the current BLOCK_I and the previous quantized BLOCK_I is not greater than a predetermined value, and the difference between the current BLOCK_J and the previous quantized BLOCK_J is not greater than a predetermined value, the deringing filtering is not performed.

In the case of the intra-frame, first of all, it is investigated whether the ringing flag of BLOCK_I requires the deringing filtering. The deringing filtering is performed if the deringing filtering is required, and otherwise, the deringing filtering is not performed.

In the case of inter-frame, a determination of whether to perform the deringing filtering for reducing the ringing noise is made as follows. That is, if BLOCK_I is an intra-block, deringing filtering is performed. If BLOCK_I is not an intra-frame and has 8×8 prediction mode, deringing filtering is performed. In the case where BLOCK_I is not the intra-block and has no 8×8 prediction mode, if the RF1 of BLOCK_I indicates a need for ringing filtering, the deringing filtering is performed. If the RF1 of BLOCK_I indicates no need of ringing filtering, deringing filtering is not performed.

The deringing filtering is composed of edge detection and 2-D signal adaptive filtering. In order to prevent the image details from being distorted by filtering, simple edge detection is performed before filtering. Edge detection and 2-D signal adaptive filtering are applied to an 8×8 block in the case that the above condition is satisfied to reduce the ringing noise as shown in FIGS. 7A and 7B.

Edge detection in the first and second embodiments of the deringing filtering will be described. One-D horizontal and vertical gradient operators are applied to the reconstructed blocks in order to fine the image edges. The threshold value for deciding the edge pixels is selected from the H.263 quantization factor QP. In order for 2-D SAF to be applied to 8×8 pixels, edge information must be obtained for a 10×10 which is the current block, as shown in FIG. 7B. In the horizontal edge detection, assuming that a pixel[m,n] is the current pixel, a pixel[m][n+1] is located to the right of the pixel[m][n], a pixel[m][n−1] is located to the left of the pixel[m][n], the difference between the pixel[m][n] and pixel[m][n+1] is A1, the difference between the pixel[m][n] and the pixel[m][n−1] is A2, and QP is the H.263 quantization factor, when the conditional expression ((A1>QP) and (A2>QP)) or (A1>2QP) or (A2>2QP) is satisfied, the current pixel is detected as a edge pixel, and the edge map, Edge[m][n], becomes 1. In the vertical edge detection, assuming that the current pixel is pixel[m][n], a pixel[m+1][n] is located above the pixel[m][n], a pixel[m−1][n] is located below the pixel[m][n], the difference between the pixel[m][n] and the pixel[m+1][n] is A'1, the difference between the pixel [m][n] and the pixel[m−1][n] is A'2, and QP is the H.263 quantization factor, when the conditional expression ((A'1>QP) and (A'2>QP)) or (A'1>2QP) or (A'2>2QP) is satisfied, the current pixel is detected as an edge pixel, and the edge map, Edge[m][n], becomes 1.

The edge map, Edge[m][n], is obtained from pixel values, pixel[m][n], according to the following algorithm.

```
/*Horizontal edge detection*/
A1 = |pixel[m][n]−pixel[m][n+1]|;
A2 = |pixel[m][n]−pixel[m][n−1]|;
if (((A1>QP) and (A2>QP)) or (A1>2QP) or (A2>2QP))
    Edge[m][n] = 1;
else{    /*vertical edge detection*/
    A1 = |pixel[m][n]−pixel[m+1][n]|;
    A2 = |pixel[m][n]−pixel[m−1][n]|;
    if (((A1>QP) and (A2>QP)) or (A1>2QP) or (A2>2QP))
        Edge[m][n] = 1;
}
```

Next, the deringing filtering using the 2-D SAF will be described. The deringing filtering is proposed to smooth the ringing noise without significant loss of image details. The deringing filtering according to the present invention is a simple convolution operation in which the weighting factors for the convolution are varied according to the edge map. The SAF is applied to the decoded block by using Edge map[m][n]. The kernel for 2-D SAF is shown in FIG. 7A. When the central point A of the filter window in FIG. 7B is on the edge pixel, the 2-D filtering operation is not performed (EXAMPLE 1 in FIG. 7B). If no edge point is included in the 4-connected filter window, low-pass filtering is performed (EXAMPLE 2 in FIG. 7B) If some edge points, not on the center point, are in the 4-connected filter window, weighted filtering to exclude the edge pixels is performed (Example 3 in FIG. 7B). The weighting factors are defined in consideration of computational complexity, so the signal adaptive filtering can be performed by simple shift and addition operations as shown in Table 1. In Table 1, '0' means a non-edge point and '1' means an edge point in the left five columns.

3. Padding of Blocking Flags

Figure 8:
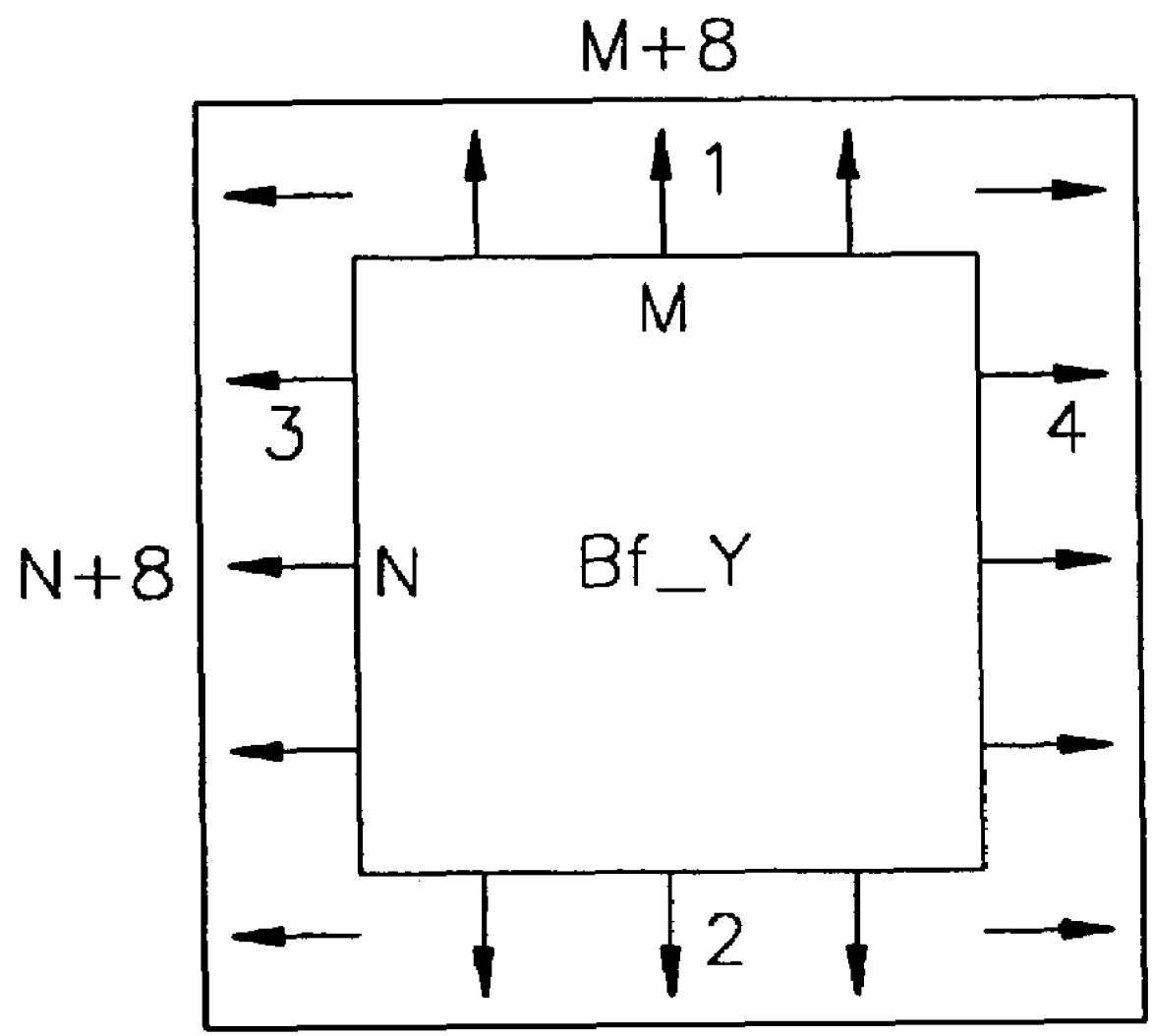
FIG. 8 shows the result of Bf_Y padding.

The padding of blocking flags is performed in the second embodiment. In the case of QCIP, Bf_Y (Blocking flags for Y) is composed of a 22×18 array and both Bf_Cb (Blocking flags for Cb) and Bf_Cr (Blocking flags for Cr) are composed of an 11×9 array, in which each element contains the noise information of each block. However, when the Unrestricted Motion Vector mode is used, motion vectors are allowed to point outside the picture. Therefore, Bf_Y, Bf_Cb and Bf_Cr padding is performed in order to cover that the motion vectors point outside the picture. In case of Bf_Y, the top/bottom row elements of Bf_Y are replicated vertically in order to expand Bf_Y and horizontal repetitive padding is performed on the far left/right column elements of Bf_Y after the vertical repetitive padding. Finally, assuming that the original Bf_Y size is M×N, the resulting size becomes (M+8)×(N+8). Similarly, if the original size of Bf_Cb and Cf_Cr is M/2×N/2, the resulting sizes become (M/2+4)×(N/2+4). FIG. 8 shows the result of Bf_Y padding. The padding can be performed using various methods. For example, the padding may be performed by replicating the blocking flag of a reference frame. When a new frame to be loop-filtered enters, the padding is performed once. Then, the blocking flags of the corresponding macro block are obtained using the padded blocking flags.

TABLE 1

| A | B | C | D | E | SAF |
|---|---|---|---|---|---|
| 0 | 0 | 0 | 0 | 0 | $A = (4A + B + C + D + E + 4)/8$ |
| 0 | 0 | 0 | 0 | 1 | $A = (4A + B + 2C + D + 4)/8$ |
| 0 | 0 | 0 | 1 | 0 | $A = (4A + 2B + C + D + 4)/8$ |
| 0 | 0 | 0 | 1 | 1 | $A = (2A + B + C + 2)/4$ |
| 0 | 0 | 1 | 0 | 0 | $A = (4A + B + D + 2E + 4)/8$ |
| 0 | 0 | 1 | 0 | 1 | $A = (2A + B + D + 2)/4$ |
| 0 | 0 | 1 | 1 | 0 | $A = (2A + B + E + 2)/4$ |
| 0 | 0 | 1 | 1 | 1 | $A = (A + B + 1)/2$ |
| 0 | 1 | 0 | 0 | 0 | $A = (4A + C + 2D + E + 4)/8$ |
| 0 | 1 | 0 | 0 | 1 | $A = (2A + C + D + 2)/4$ |
| 0 | 1 | 0 | 1 | 0 | $A = (2A + C + E + 2)/4$ |
| 0 | 1 | 0 | 1 | 1 | $A = (A + C + 1)/2$ |
| 0 | 1 | 1 | 0 | 0 | $A = (2A + D + E + 2)/4$ |
| 0 | 1 | 1 | 0 | 1 | $A = (A + D + 1)/2$ |
| 0 | 1 | 1 | 1 | 0 | $A = (A + E + 1)/2$ |
| 0 | 1 | 1 | 1 | 1 | $A = A$ |

The invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium having a computer readable program code unit embodied therein for loop-filtering for reducing the quantization effect generated when encoding and decoding the image data, the computer readable program code means in the computer usable medium comprising: computer readable program code means causing a computer to effect extracting a flag indicating whether the image data requires loop-filtering using the distribution of IQCs of an inverse quantized image data, and a motion vector indicating the difference between the previous frame and the current frame; and computer readable program code means causing a computer to effect filtering the image data corresponding the flag by a predetermined method if the extracted flag indicates a need for the loop-filtering.

A functional program, code and code segments, used to implement the present invention can be derived by a skilled computer programmer from the description of the invention contained herein.

When restoring the highly compressed image data, the quantization effect such as blocking artifacts, corner outliers and ringing noise occurs. The loop-filtering method according to the present invention reduces the quantization effect using the flags and adaptive filter. The blocking and ringing flags of each block contribute to reduce the amount of computation in loop-filtering. In order to extract the blocking and ringing flags on the current block, the motion vector of the inter-frame is used.

In video coding, in order to implement a high-quality image and hardware and software easily from the present invention, the complexity in computation and PSNR must be considered. The method according to the present invention can be performed by a parallel processing without multiplication and division, thereby reducing the complexity of hardware.

The loop-filtering according to the present invention can greatly improve the subjective quality while maintaining image details, so that the loop-filtering can be applied widely.

What is claimed is:

1. A method for filtering image data, comprising the steps of:

generating information indicating whether a block requires filtering, based on a degree of overlap resulting from applying motion vectors corresponding to the block constituting the image data; and filtering the block according to the generated information.

2. The method of claim 1, wherein a motion block is the block constituting the image data transformed according to the motion vector and the degree of overlap is an overlap of the motion block and a reference block.

3. The method of claim 2, wherein the block constituting the image data is in an inter-frame and the reference block is in a reference frame of the image data.

4. The method of claim 1, wherein the degree of overlap indicates a distance of the motion vectors in pixel units.

5. The method of claim 1, wherein the information is information concerning blocking noise.

6. The method of claim 1, wherein the information is information concerning ringing noise.

* * * * *